INVENTOR.
Norio Saito
BY

INVENTOR.
Norio Saito

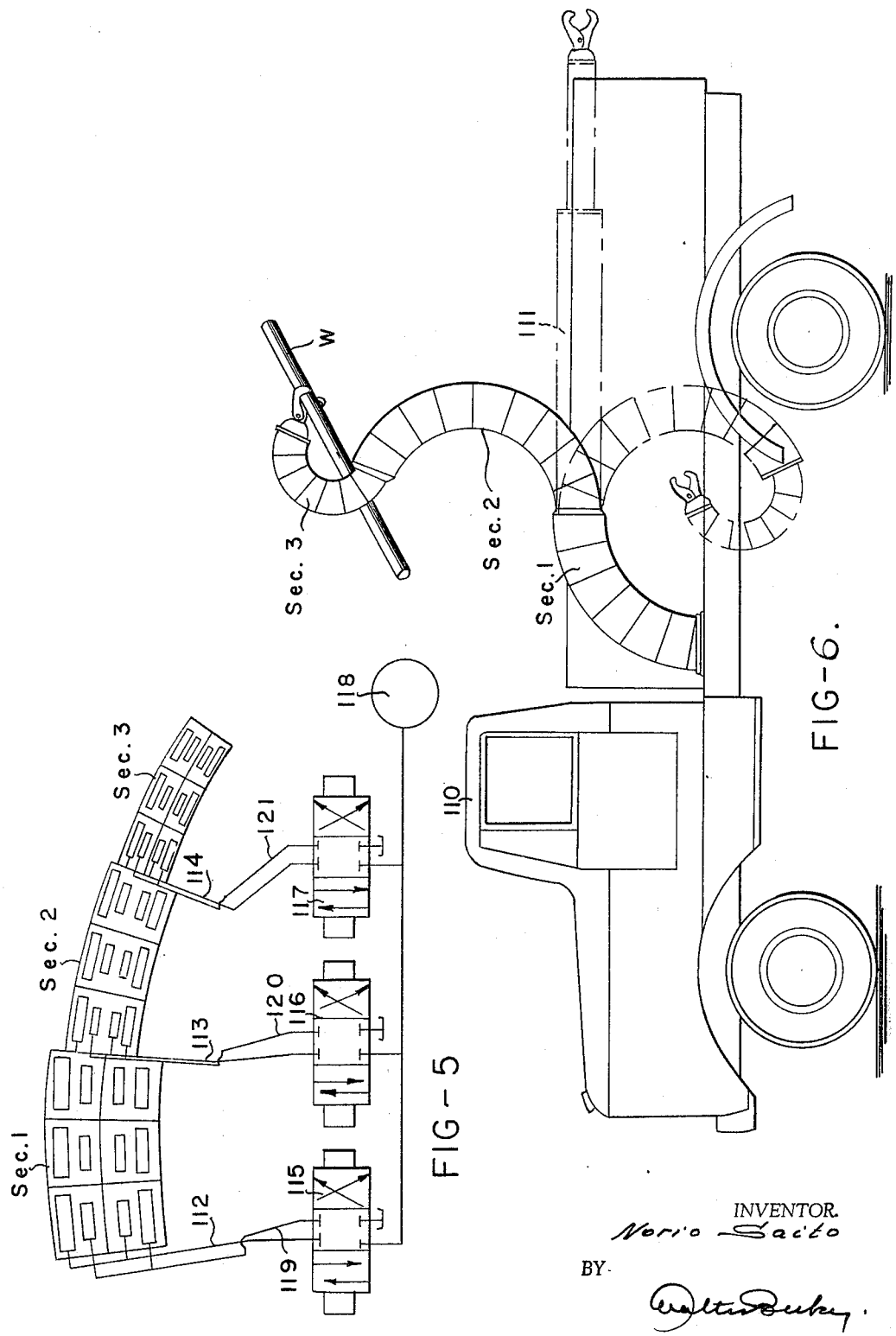

United States Patent Office
3,284,964
Patented Nov. 15, 1966

3,284,964
FLEXIBLE BEAM STRUCTURES
Norio Saito, 88 Kirisato-machi, Ota-ku, Tokyo, Japan
Filed Mar. 26, 1964, Ser. No. 355,119
6 Claims. (Cl. 52—2)

The present invention relates to beam structures for supporting loads and, more particularly, to new flexible beam structures which are capable of supporting or transporting a load and of bending in every direction as desired.

An object of the present invention is to provide a novel flexible beam structure which is able to bend in every desired direction by controlling the supply of the energy into the beam structure.

Another object is to provide a flexible beam structure for supporting a load.

A further object is to provide a flexible beam structure for carrying or transporting a load to the desired position by bending the beam structure.

An additional object is to provide a flexible beam structure which may be used as mechanical elements for the machine or construction.

The manner in which the foregoing and other objects of the present invention are accomplished will be apparent from the accompanying specification considered together with the drawings, wherein:

FIG. 5 is a schematic view showing a controlling system for the beam structure of the present invention; and FIG. 6 is a sectional view illustrating a further embodiment of the beam structure according to the present invention.

Figure 1:
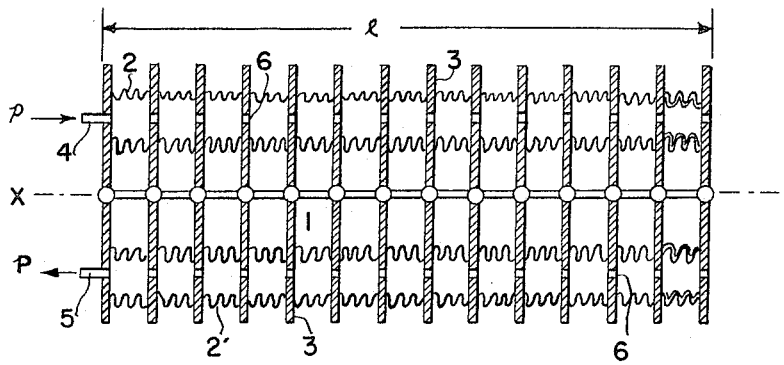
FIG. 1 is a sectional view illustrating a principal construction of a beam structure according to the present invention.

Referring now to FIG. 1 of the drawings, it shows the basic construction of a portion forming the flexible beam structure according to the invention, comprising a core member 1 which is extended longitudinally through the structure in the center portion, a number of bellows 2 and 2′, members 3 for supporting bellows, and conduit means 4 and 5 connecting the bellows 2 and 2′ to a supply of pressure supply through a controlling system. The both ends of bellows are fixed to the supporting members 3 which in turn are secured to the core member by any suitable means such as, for example, welding or soldering. The core member 1 may be made from the flexible material such as steel wire or sheet steel. At least a pair of bellows 2 and 2′ are arranged symmetrically with respect to the core member 1 and a number of pairs of bellows are arranged in series to form the flexible beam structure.

Figure 2A:
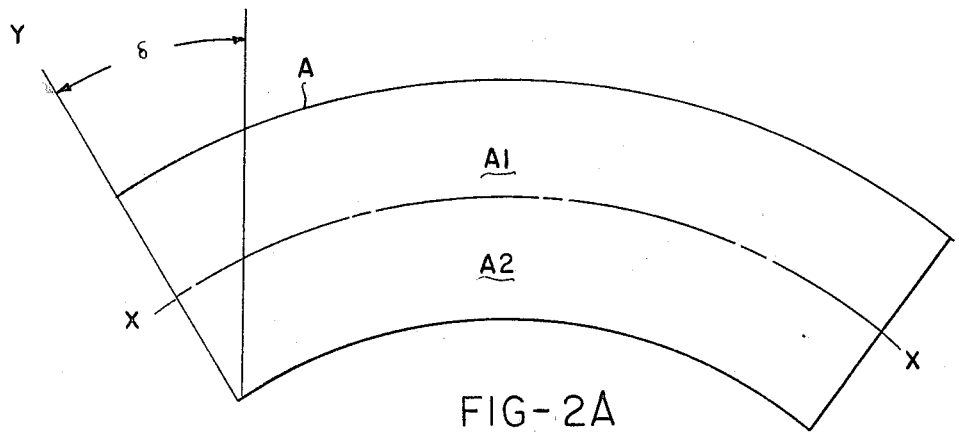
FIG. 2A to FIG. 2D show diagrams explaining the principle of the present invention.
Figure 2B:
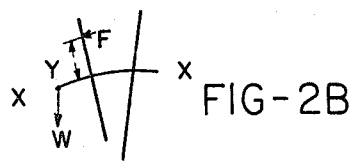

As shown in FIG. 2A, if any external force is applied to a beam A, it will be bent. In this instance, for example, the upper side $A_1$ of the beam will be lengthened, lower side $A_2$ will be shortened, and at the neutral surface extending along the longitudinal axis $x$—$x$ of the beam A takes place no change in its length.

In this instance, the normal stress $\sigma_x$ with respect to the both sides $A_1$ and $A_2$ is represented as follows:

$$\sigma_x = My/I_z \qquad (1)$$

where M represents a bending moment, $I_z$ represents the secondary moment of inertia with respect to an axis Z, and y represents a distance from the neutral surface to the center of a sectional area.

In the present invention, it is intended that the fluid pressure of $\pm p$ is substituted for the normal stress $\pm \sigma_x$ shown in the above Equation 1 so as to obtain the following relation with respect to a force F acting to a cross section A normal to the longitudinal axis of the beam:

$$F = \int_0 \sigma_x \, \delta A = pA$$

Under the Hooke's law, the flexure of the flexible structure according to the above-mentioned bending moment is shown as in the following:

$$\delta = \frac{Fl}{EA}$$

where
$F$ = tensile or compressive force
$E$ = modules of direct elasticity
$A$ = cross sectional area of the beam
$l$ = total length of the beam structure In the construction shown in FIG. 1, it is considered that the fluid of the pressure $+p$ is introduced into the bellows 2 through the conduit 4 and the pressure in the bellows 2′ is reduced to $-p$.

Figure 2C:
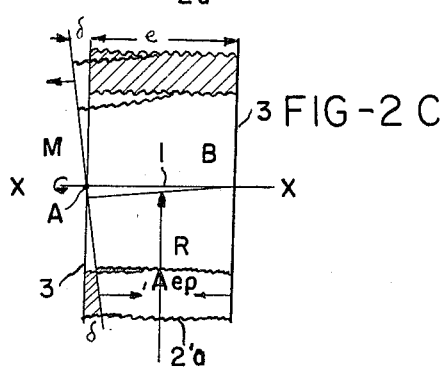

For convenience, the explanation will be referred to FIG. 2c which shows a portion of the beam structure constituting a pair of bellows 2 and 2′. In this instance, let $A_e$ be the effective area of the cross section of the bellows, then the bellows $2a$ is expanded to $\delta$ by the force $A_e p$, and the bellows $2'a$ is contracted to $\delta$ by the force $-A_e p$.

It is appreciated that instead of the vertical stress $-\sigma_x$, the force of bellows opposing against the external force $A_{ep}$ is balanced to the tensile force and the compressive force.

Therefore, in this case, the load will be considered to be a potential energy of the reaction F due to the expansion or compression $\delta$ of the bellows.

Since the rigid wall 3 is attached to the neutral core member, the moment $2|A_{ep}|$ will be transmitted to the core member and cause it to bend as A′B.

In the structure shown in FIG. 1A which is constructed by connecting a number of sections shown in FIG. 2C, the radius of curvature R of the core member may be readily varied depending upon the increase or decrease of the internal pressure $p$ so as to curve the beam as desired.

Figure 2D:
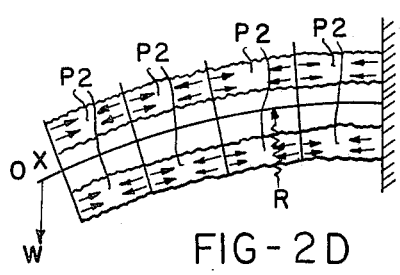

When load W is applied to the beam at point O as shown in FIG. 2D after the beam has been deflected by applying internal pressures $+p_1$ and $-p_1$ as shown in FIGURE 2D, the vertical stress $\sigma_2$ caused in section $n$ by moment $M_{AB}$ will be added to the reaction force $p_1 = \sigma_{x_1} = K/A_e$ (where K is the spring reaction force) in the bellows produced by said internal pressures. Let the value of the resultant stress be $\sigma X_3$ the following relation is established:

$$\sigma X_3 = \frac{K}{Ae} + \frac{M_{AB}y}{I_z} = \sigma_{x_1} + x_2 \qquad (3)$$

since $M_{AB}$ is the moment in the section $n$.

Accordingly, from the above Equation 3 internal pressure $+p_3$ which substitutes for the tensile stress $\sigma X_3$ will be shown in the following:

$$\sigma X_3 = p_1 - p_2 = -p_3 \qquad (4)$$

wherein, $p_2 > p_1$.

That is, when load W is applied to the deflected beam at point O, $M_{AB}$ will set up against $-p_3$ instead of O, $\sigma_{x_3}$ since the flexure $\delta$ is not changed. It is apparent that in such a case, $p_3$ opposing against $-\sigma_{x_3}$ in the compressed side is of positive sign.

As set forth above, the signs of internal pressures in the bellows in the distortional step of the beam become entirely converse when load is applied thereto.

Rigid walls always maintain bellows $2a$, $2a'$ to be in parallel with the neutral axis, and transmit the moment caused by force $A_{ep}$ to the neutral axis to distort the neutral axis. Therefore, the neutral axis member 1 and rigid walls 3 should be made to provide a sufficient rigidity and to always maintain them normal to each other.

In addition to the above, the rigid walls are caused therein a shearing strain $\gamma$ by the moment $\Delta M$ due to two equivalent but oppositely directed forces V acting upon between adjacent walls as shown in FIGURE 2D. The shearing strain is shown as follows:

$$\gamma = \tau_{max.}/G \quad (5)$$

The increment of the bending moment is $$\Delta M = Mn + 1 - Mn$$

and the relation between the moment and forces V may be expressed as follows:

$$\frac{\Delta M}{\Delta l} = v$$

where V is the shearing stress acting upon the cross section of the beam passing through the rigid wall $$\Delta M = V \Delta l \quad (6)$$

With $\Delta M$, the force S exerted on the neutral member 1 from the rigid walls 3 may be expressed as follows:

$$s = \frac{\Delta M}{I_z} A_e \bar{y} \quad (7)$$

wherein, $\bar{y}$ is distance from the neutral axis to the center of a section of bellows.

Since $$I_z \approx Z A_e \bar{y} 2 \quad (8)$$

Substituting the terms of Equations 5 and 6 in Equation 7, then $$s = \frac{V \Delta l}{z \bar{y}} \quad (9)$$

therefore, the maximum value of the shearing stress along the axis may be obtained by the following equation:

$$\tau_{max.} = \frac{S}{A_s} = \frac{V \Delta l}{z A_{s\bar{y}}} \quad (10)$$

Figure 3:
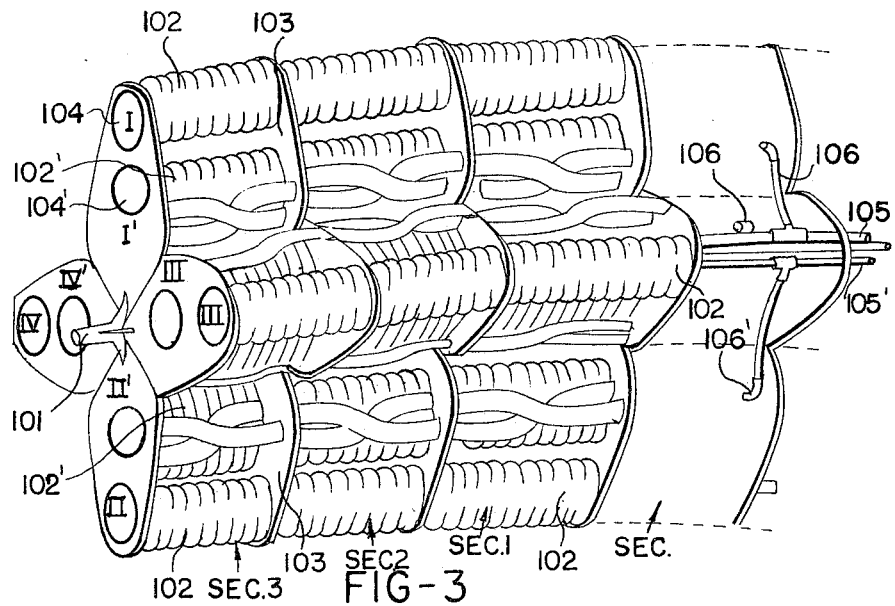
FIG. 3 is a perspective view of a portion forming the beam structure according to the present invention.

Referring to FIG. 3 of the drawings, it shows a portion or section of the beam structure according to the present invention. In this embodiment the flexible beam structure includes a core member 101, which is made of an elastic material having a circular cross section. For example the core member may be made of steel.

Sections Sec.$_1$, Sec.$_2$, Sec.$_3$, and so on having a number of bellows 102 are mounted around the core member 101, symmetrically, in the manner as mentioned under. In the embodiment shown in FIG. 3, the sections having bellows are arranged adjacently each other and bellows of the sections Sec.$_1$, Sec.$_2$, Sec.$_3$ and others are communicated each other through openings 104, 104' in supporting members 103. Since each section is the same in construction, one of sections is explained in detail.

The section Sec. consists of the first and second bellows and the supporting members 103. The first bellows 102 is supported by the supporting members 103 and the second bellows 102' is supported by the members 103 in adjacent to the core member 101. By the expansion of the bellows 102' the supporting members 103' arranged to the both ends of the bellows are drawing each other and therefore the opposite motion with respect to the motion of the supporting members 103 to be expanded is provided, which the motion corresponds to the force $-p_3$ in the Equation 4.

Since the two bellows 102 and 102' are arranged to elongate or shorten in proportion to the radial distance from the core member 101 is eliminated, and the member 101 serves substantially as the neutral axis.

The support member 103 may be secured to the core member by welding or any other suitable ways. The section is expanded or contracted, as desired, longitudinally by increasing or reducing the pressure in bellows through a pressure control means (not shown) in conduit means 105, 105' connected to a supply of pressure fluid.

The conduit means 105, 105' are respectively connected to the bellows 102, 102' in the first section by means of branch conduits 106, 106'. If the pressured fluid from the supply through the pressure control means be introduced into the conduit 105, it passes into the bellows 102 of the raw I in the first section Sec. through the branch pipe 106 from the conduit 105, then it introduced to the bellows 102 of the same raw in the adjacent section Sec., through the openings 104, in the supporting member 103 while the pressure in bellows 102' of the first raw I is reduced, and the raw I of the all sections will be elongated. At the same time, if the pressure in bellows 102 in the raw II is withdrawn therefrom through the conduits 106, the raw II will be conversely shortened, and the beam structure is bent as shown in FIG. 2A as the whole.

In the embodiment shown in FIG. 3, there are eight, raws (I, I'; II, II'; III, III'; IV, IV') of the bellows. It will be appreciated from the above description that the beam structure is bent to the desired direction by controlling the supply to the pressure fluid into the bellows.

Figure 4:
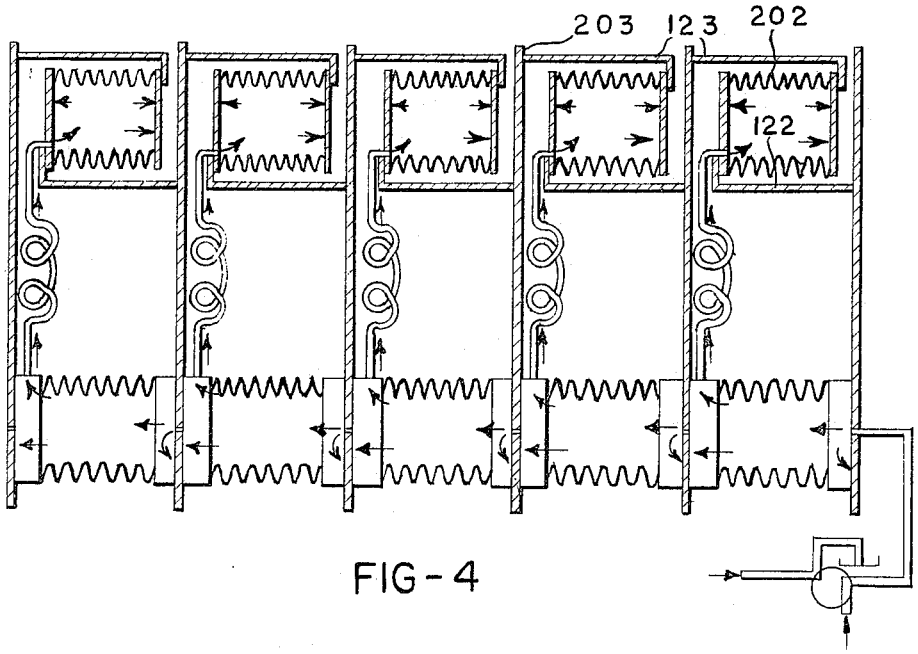
FIG. 4 is a view of the beam structure which is applied for a crane carried on a motor truck.

FIG. 4 of the drawings shows an application for a hoisting of the beam structure according to the present invention. In flexible beam structure 111 mounted on a motor-truck 110, the sectional areas of the sections constituting the beam are decreased from a base section Sec.$_1$ to a free end section Sec.$_3$. By controlling the supply of the fluid pressure to the bellows in each section as desired, each section may be bent in every direction. Thus the flexible beam structure 111 may be used to move or lift and down the load W to be transported.

FIG. 5 shows a control system of the beam structure according to the present invention in a schematic diagram. The upper side bellows in the sections Sec.$_1$, Sec.$_2$, and Sec.$_3$ are respectively connected through lines 112, 113, and 114 to control valve means 115, 116 and 117 which are in turn connected with a common pressure fluid supply 118. On the other hand, the lower side bellows in the Sec.$_1$, Sec.$_2$ and Sec.$_3$ of the beam are also respectively connected through lines 119, 120 and 121 to the respective control valve means 115, 116 and 117. The control valve means 115, 116 and 117 will be controlled manually or automatically by means of a suitable control mechanism to pass the pressurized fluid flow from the supply 118 to either lines 112, 113 and 114 or lines 119, 120 and 121. Accordingly, by controlling the valve means, the upper side bellows or the lower side bellows in each of the sections will be bent toward the desired direction.

FIG. 6 shows a further embodiment of the beam structure of the present invention, in which both free ends of the bellows 202 in each section are respectively connected through an arm structure 122 or 123 to the supporting members 203 facing the opposite side of the respective end of the bellows, so that if the bellows is expanded by supplying the pressure fluid, the side of the section having such bellows is shortened.

As it is clearly understood from preferred embodiments of the present invention set forth above, the flexible beam structures according to the present invention provide a sufficiently large flexure equivalent to the flexure to be produced when an external bending force is applied thereto, and since they are durable against a large load, they may be used as movable structural members or power transmitters in machines, vessels, buildings as well as in aircrafts.

What I claim is:

1. A flexible beam structure comprising a central, longitudinally extending, flexible core member, a plurality of longitudinally spaced, radially extending members fixed to said core member, at least three longitudinally expansible and contractable fluid pressure elements between each pair of radially extending members spaced circumferentially about said core member, and fluid pressure means for selectively controlling the fluid pressure in said fluid pressure elements to expand or contract said elements selectively.

2. A flexible beam structure comprising a central longitudinally extending flexible core member, and a plurality of longitudinally arranged sections connected to said core member, each of said sections being formed of a plurality of circumferentially arranged, longitudinally expansible and contractable fluid pressure elements arranged circumferentially about said core member and a pair of radial members carried by said core member and supporting the fluid pressure elements of said section, and fluid supply and control means connected to said individual fluid pressure elements for selectively increasing or decreasing the fluid pressure in said elements to expand or contract said elements selectively.

3. A continuous, flexible, linear structure comprising a plurality of series of longitudinally expandable and contractable fluid pressure elements arranged about a central axis with the axes of said series parallel and the elements of each series connected to elements of adjoining series, the elements of each series being connected end to end with their longitudinal axes coinciding with the axis of the series, fluid pressure connections to said fluid pressure elements and control means to control selectively the increase and decrease of pressure in said fluid pressure elements.

4. A continuous, flexible, linear structure comprising at least two series of longitudinally expandable and contractable fluid pressure elements arranged on opposite sides of a central axis with the axes of said series parallel and the elements of each series connected to elements of adjoining series, the elements of each series being connected end to end with their longitudinal axes coinciding with the axis of the series, fluid pressure connections to said fluid pressure elements and control means to increase or decrease selectively the pressure in said fluid elements.

5. A continuous, flexible, linear structure comprising at least three series of longitudinally expandable and contractable fluid pressure elements arranged about a central axis with the axes of said series parallel and spaced not less than 180° and the elements of each series connected to elements of adjoining series, the elements of each series being connected end to end with their longitudinal axes coinciding with the axis of the series, fluid pressure connections to said fluid pressure elements, and control means to increase or decrease selectively the pressure in said fluid elements.

6. The method of controlling the rigidity and direction of curvature of a continuous, flexible structure which is formed with a plurality of longitudinally expandable and contractable fluid pressure elements arranged in a plurality of longitudinal series about a central longitudinal axis with the elements of each series connected end to end and connected to elements of adjoining series, said method comprising selectively increasing or decreasing the fluid pressure in said elements so as to expand the elements on one side of said central axis relative to those on the other side at selected positions along said structure, thereby producing curvature of said structure at different positions.

References Cited by the Examiner

UNITED STATES PATENTS 2,702,053    2/1955    Baker _____ 92—39
2,875,913    3/1959    Gohrke _____ 214—654

FOREIGN PATENTS 737,014    9/1955    Great Britain.

MARVIN A. CHAMPION, *Primary Examiner.*